No. 825,605. PATENTED JULY 10, 1906.
W. LASKA.
DISTANCE INSTRUMENT.
APPLICATION FILED SEPT. 8, 1905.

2 SHEETS—SHEET 1.

Witnesses:
B. H. Gaaden
W. H. Regoor

Inventor:
Waclaw Laska,
By Alfred Müller.
Atty.

No. 825,605. PATENTED JULY 10, 1908.
W. LASKA.
DISTANCE INSTRUMENT.
APPLICATION FILED SEPT. 3, 1905.

2 SHEETS—SHEET 2.

Witnesses:
J. R. Wanlinger
L. H. Standen

Inventor:
Waclaw Laska,
by
Att.

UNITED STATES PATENT OFFICE.

WACLAW LASKA, OF LEMBERG, AUSTRIA-HUNGARY.

DISTANCE INSTRUMENT.

No. 825,605.  Specification of Letters Patent.  Patented July 10, 1906.

Application filed September 8, 1905. Serial No. 277,561.

*To all whom it may concern:*

Be it known that I, WACLAW LASKA, a subject of the Emperor of Austria-Hungary, residing at Lemberg, Galicia, Austria-Hungary, have invented certain new and useful Improvements in Distance Instruments, of which the following is a specification.

Since distance instruments have been invented attempts have been constantly made to simplify or even to do away with the calculations; but even the best solutions of these problems have not produced satisfactory instruments, as in such instruments the readings are not sufficiently exact and satisfy only the requirements of a topographer and not those of an engineer.

The object of this invention is to produce a distance instrument which enables the difference of levels and the horizontal distance for ordinary ranges to be determined at once with the accuracy of one decimeter without any tedious calculations.

The construction of this distance instrument is based on two theoretical principles. The determination of horizontal distance is effected on the "contact" principle, which enables such distance to be read directly on the linear scale by raising a fixed thread. The difference in height $h$ can be determined from the horizontal distance $d$, thus ascertained, by means of the angle of elevation $a$, according to the following equation:

$$h = d \tan. a.$$

For effecting this multiplication with tan. $a$ there is used a wire or thread adjustable in the field of vision by means of a micrometric screw, which wire can be set in such manner that the difference in height or elevation can be at once determined from the reading after raising the telescope, with the help of the reading of the fixed wire before the raising.

Figure 1:
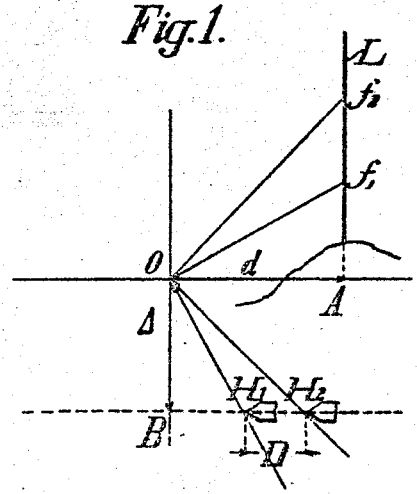
Figure 2:
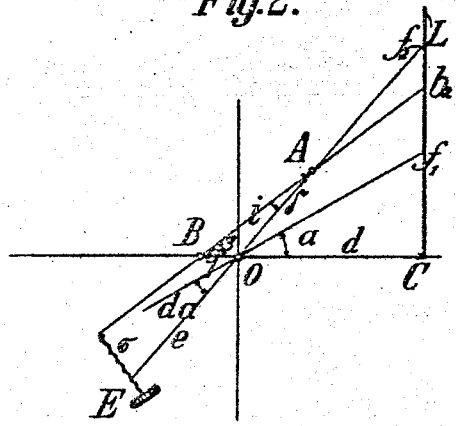
Figure 3:
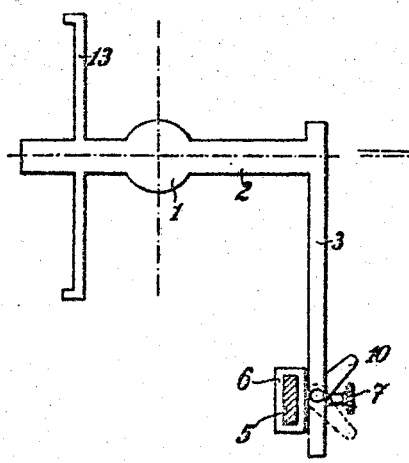
Figure 4:
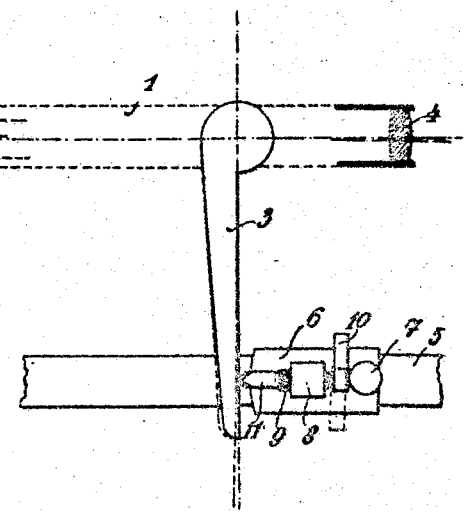
Figure 5:
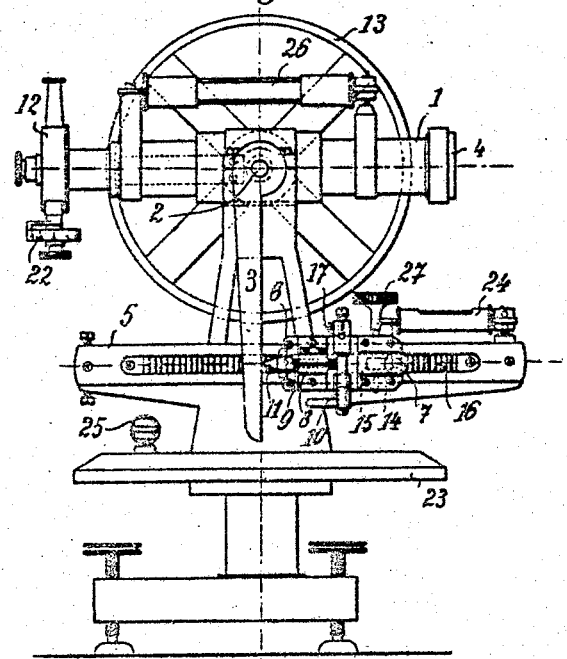
Figure 6:
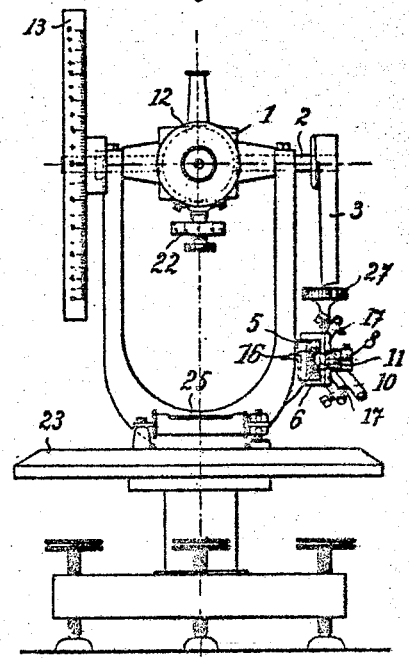

Figures 1 and 2 are diagrams illustrating the principle on which the construction of my new instrument is based. Figs. 3 and 4 are a diagrammatic front and side view, respectively, of my new instrument. Fig. 5 is a side view showing a modification of the instrument. Fig. 6 is a front view thereto, and Fig. 7 a plan view. Figs. 8 and 9 are detail views of the "filar" screw-micrometer.

If $f_1$ is the reading of the fixed wire on the linear scale before the telescope has been raised, $f_2$ the reading on the linear scale of the fixed wire after the raising of the telescope, and $b_2$ the reading on the linear scale of the adjustable wire after the raising of the telescope, then, if the dimensions of the instrument are such that its constant is one hundred, 1. $d = (f_1 - f_2) \times 100.$ 2. $h = (f_1 - b_2) \times 100$, and the height can be checked after the elevation angle $a$ has been read off from the formula.

3. $h = (f_1 - f_2) \times 100 \times \tan. a.$

The instrument used for finding the readings $f_1, f_2,$ and $b_2$ is provided with horizontal and vertical limbs, like a theodolite. To the axis of rotation or pivot of the telescope is secured a lever-arm on which acts a setting device by means of which the telescope can be given two positions, which always deviate from each other to the same extent. The telescope is also provided with an ocular filar screw-micrometer, the adjustable wire of which during the first adjustment of the telescope can be set on the specially-calculated division of the vertical limb (hereinafter referred to as "index" division) in such manner that the reading of the movable wire divides the two readings of the fixed wire in proportion of $$\frac{1}{100} d (1 - \tan. a) \text{ to } \frac{1}{100} d \tan. a.$$

The construction of the instrument is based on the following principle: Let L be the length of the vertically-placed scale; $f_1$ and $f_2$ the readings on the linear scale before and after the turning of the telescope; $AO = d$, the horizontal distance of the linear scale from the center of the instrument; $OB = \varDelta$, the shortest length of the telescope-lever, the operative length of which is adjustable; $H_1 H_2 = D$, the constant amount of turning. Then in Fig. 1, owing to the similarity of the triangles $OH_1 H_2$ and $O f_1 f_2$, we shall have 4. $d = \dfrac{\varDelta}{D} (f_1 - f_2.)$ If $\varDelta$ is made equal to 100 D, which practically can be done with absolute accuracy, then 4ª. $d = 100 (f_1 - f_2)$ that is to say, the distance to be ascertained is equal to one hundred times the amount of the difference of the reading before and after the turning.

As the millimeters on the linear scale can still be accurately estimated at a distance of one hundred meters, such distances can be ascertained with an accuracy of ± 1 decimeter.

The movement of the adjustable wires in the filar micrometer for the purpose of obtaining the angle of elevation is effected on the basis of the following calculation: Let O, Fig. 2, be the center of the instrument and $$OC = d = \frac{\Delta}{D}(f_1 - f_2)$$

the distance of the linear scale from the center of the instrument. Further, let $a$ be the angle of elevation in one position (before turning) and $a + da$ the angle in the other position (after the turning) of the telescope, $da$ indicating the constant angle of raising. Then we shall have 5. $Cf_1 = d \tan. a.$ 6. $Cf_2 = d \tan. (a + da.)$ If the optical center of the object-glass is at A and if $OA = \delta$, $\angle BAD = i$ $\angle ABO = \varphi$ and $BO = q$, then $\varphi = a + da - i$. Further, $Cb_2 = (d + q) \tan. \varphi$, or, since it follows from the triangle BAO that $$q = \frac{\delta}{\sin. \varphi} \sin. i,$$

we obtain

7. $Cb_2 = d \tan. \varphi + \frac{\delta \sin. i}{\cos. \varphi}.$

In order to make possible the calculation mentioned before in the equation 2, the adjustable wire of the filar screw-micrometer must be set in such manner that $$Cb_2 - Cf_1 = (Cf_2 - Cf_1) \tan. a.$$

By substituting the values of $Cf_1$ $Cf_2$ $Cb_2$ from the equations 5, 6, and 7 we shall have $$d(\tan. \varphi - \tan. a) + \frac{\delta \sin. i}{\cos. \varphi} =$$
$$d[\tan. (a + da) - \tan. a] \tan. a.$$

This equation, considering that $$\tan. (a + da) - \tan. a = \frac{\tan. da}{\cos.^2 a}$$

and that the angle $i$ is very small, and consequently it can be assumed that $$\frac{\delta \sin. i}{\cos. \varphi} = \frac{\delta \tan. i}{\cos. a}$$

is converted into

8. $\frac{\tan. i}{\cos.^2 a}(1 - \frac{\delta}{d}\cos. a) = \frac{\tan. da}{\cos.^2 a}(1 - \tan. a;)$ but as $$\frac{\tan. da}{\cos.^2 a} = \frac{D}{\Delta}$$

we obtain

9. $\tan. i = \frac{D}{\Delta} \cdot \frac{(1 - \tan. a) \cos.^2 a}{1 - \frac{\delta}{d} \cos. a}$ If we indicate the position of the screw of the filar screw-micrometer corresponding to the angle $i$ with $\sigma$ and if the distance of the screw from the center of the instrument $e = OE$, then $$\tan. i = \frac{\sigma}{e + \delta}.$$

It is therefore

10. $\sigma = \frac{D}{\Delta} \cdot \frac{e + \delta}{1 - \frac{\delta}{d} \cos. a} \cdot (1 - \tan. a) \cos.^2 a.$ This equation can also be simplified by the introduction of a constant $\sigma_o$ for the angle of elevation $a = o$.

11. $\sigma_o = \frac{D}{\Delta} \cdot \frac{e + \delta}{1 - \frac{\delta}{d}}$ and consequently $$\sigma = \sigma_o \cdot \frac{1 - \frac{\delta}{d}}{1 - \frac{\delta}{d}\cos. a} (1 - \tan. a) \cos.^2 a.$$

As, however, owing to the smallness of $\frac{\varepsilon}{d}$ this fraction can be neglected, we shall have 12. $\sigma = \sigma_o (1 - \tan. a) \cos.^2 a,$ in which $\sigma_o$ indicates the constant screw value of the lowering of the movable wire in the horizontal position of the telescope. If the adjustable wire is now moved relatively to the fixed one in the filar screw-micrometer to the extent of $\sigma$, this will mean that the angle of elevation will have been considered in the setting of the adjustable wire, so that it will be 13. $b_2 - f_1 = (f_2 - f_1) \tan. a,$ and the difference of level will be obtained from the equation 14. $H = (b_2 - f_1) \times 100$, if $\Delta$ is made $= 100$ D.

In order to obtain the value of $\sigma$ corresponding to every angle of elevation $a$, the index division on the vertical limb is marked in accordance with the formula 12, so that this value can be read on the vertical limb in every case. To the horizontal position of the telescope will correspond the reading "5" on the index division and to the position of "45°" the reading "0". The "ocular filar" screw-micrometer is set to suit the readings on the index division, and in this way the adjustable wire is set in a corresponding manner.

As will be seen from the formula 11, $\sigma_o$ is not strictly constant, as $e$ and $d$ are different for the different positions of the telescope. This want of constancy cannot, however, be removed mechanically. The level differences cannot therefore be obtained with the same accuracy as the horizontal distances, and the inaccuracy will be the greater the smaller the distances; but even in considering the unavoidable reading error at the index division on the vertical limb; they will be just as accurate as those obtained with the ordinary distance instrument.

In measuring elevations the equation 3 can be utilized for the purpose of checking, the angle of elevation $a$ being capable of being read on a scale on the back of the vertical limb.

For increasing the accuracy the fixed wire can be directed to the different points of the linear scale and the adjustable wire set accordingly and the necessary readings made, whereupon the required distance and elevation will be obtained with great accuracy from the mean.

As will be seen from Figs. 3 and 4 of the drawings, which show the instrument diagrammatically in front and side elevation, the telescope 1 is secured to its axis of rotation or pivot 2. This axis of rotation is arranged in such a manner that the telescope is heavier on the side of the eyepiece. On the axis or spindle 2 is mounted a lever 3, normal to the optical axis of the telescope, the edge of said lever facing the object-glass 4, passing exactly through the center of the axis, Fig. 4. Each movement of the lever 3 is therefore transmitted to the telescope and raises or lowers it, (turns or tips it.) At a certain constant distance below the telescope is arranged a horizontal bar 5, on which is adjustably mounted a rider or slide 6, the fixing of which is effected by means of a fixing-screw 7. This slide 6 carries in a nut 8 a set-screw 9, which can be operated by a lever 10, provided at one end. The travel of that lever is limited by stops 17. The screw 9 acts on a steel knife-edge 11, against which the lever 3 is pressed by the heavier weight of the eyepiece side of the telescope. The eyepiece is provided with a filar screw-micrometer 12. (Illustrated in Fig. 8 in cross-section and in Fig. 9 in side elevation.) It is provided in a well-known manner with fixed horizontal and vertical wires 18 and 19 and an adjustable horizontal wire 20, which can be moved away from or brought nearer to the fixed wire by turning the micrometric screw 21.

Figure 7:
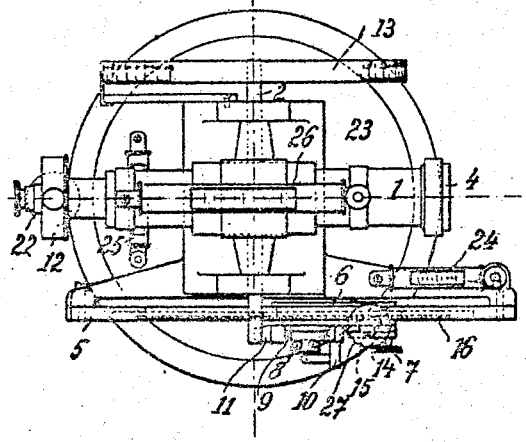
Figures 8, 9:
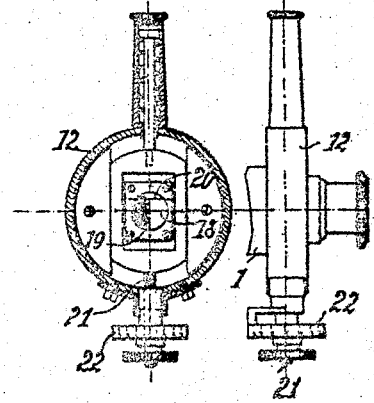

The modification of the instrument shown in Figs. 6 and 7 in front elevation, side elevation, and plan view is provided with a fixing-screw 7, pressing against a pressing-block 14, movable with the slide 6, and is further provided with a pinion or gear 15, which engages with a rack 16, arranged in a groove of the horizontal bar 5, so that the movement of the slide 6 along the said horizontal bar may be effected by turning the pinion 15 by means of the head 27.

The vertical limb 13 is provided on one side with an index division calculated in accordance with the formula 12, and on the other side it can be provided with a graduation (in degrees) for direct reading of angles of elevation. The division of the filar screw-micrometer is arranged in accordance with this index division, whole turns (height of pitch) being obtained on the scale visible through the eyepiece tenths of a revolution on the division-strokes of the micrometric drum, and the one-hundredths are estimated. The arrangement is such that five pitches (revolutions) of the screw correspond to the constant, (preferably one hundred.)

The head of the filar screw-micrometer 12 can be turned in such manner that the micrometric drum 22 can be made to lie downward or be turned through an angle of one hundred and eighty degrees upward. The first of these two positions serves for determining angles above and the second angles below the horizontal.

The instrument, which is built like a theodolite, can further be provided with a horizontal limb 23, with levels 24 and 25 for horizontal adjustment. For the purpose of leveling, the telescope is provided with a surveying-level 26. According to the size and the purpose of the instrument, the divisions can be made different and with varying degrees of fineness. This device can be utilized both in a theodolite-like instrument and in a tachometric tipping rule or separately as distance and elevation measurer, the index-division on the horizontal bar being arranged as linear division, of course after correspondingly modifying the formula required for the purpose.

When being used, the instrument is first placed in horizontal position in the well-known manner. Further manipulation is different for angles above the horizontal (no degrees to fifty degrees) and below the horizontal, (three hundred and sixty degrees to three hundred and ten degrees.)

A. *Determination of distance and difference of level or height with angles above the horizontal.* By shifting the slide 6 with the lever 10 raised (full lines in Figs. 3 and 4) and micrometric drum lowered below, the telescope is directed to any desired point of the linear scale, and the figure is read on the vertical limb, (index division.) If desired, the actual angle of elevation can be simultaneously read for a control calculation in accordance with the equation 3. Thereupon the micrometric drum of the filar screw-micrometer is set in accordance with the index-reading on the vertical limb, care being taken that a tooth interval of the scale-bar should correspond in the field of vision to one complete revolution of the screw. In this way the adjustable thread or wire of the filar micrometer is set in such a manner that in its reading with the tipped telescope the angle of elevation is considered in determining level difference. The instrument is then ready for reading. At first the position of the fixed thread is read on the scale with the lever 10 raised ($f'$.) Thereupon the lever 10 is lowered, (broken lines, Figs. 3 and 4,) whereby the telescope is tipped to a constant extent, whereupon the position of the fixed wire $f_1$ and that of the adjustable one, $b_2$, is read on the linear scale. Then as the constant of the instrument $\frac{\Delta}{D} = 100$ the required horizontal distance will be $d = 100(f_1 - f_2)$ and the level difference $h = 100(f_1 - b_2)$ $h$ being calculated $= 100 (f_1 - f_2)$ tan. $a$ for checking purposes.

B. *Definition of distance and level difference with angles below the horizontal.* The manipulation of the instrument is here the same, but with the difference that the micrometric drum is raised and the first position, as well as the index-reading (or that of the angle $a$ below the horizontal) takes place with the lever 10 lowered, while the second position of the fixed thread or wire as well as the reading of the position of the adjustable wire take place with the lever 10 raised. Then $$d = 100 (f_2 - f_1) \text{ and } h = 100 (b_2 - f_1) = 100 (f_2 - f_1) \tan. a,$$

$h$ being of course taken as negative. For very exact distance measurement the movable wire is brought near the fixed wire, and the telescope instead of being directed simply against the linear scale is set with the fixed wire exactly against one centimeter stroke and the linear-scale reading (whole centimeters) noted. After the tipping of the telescope the distance of the fixed wire from the next centimeter stroke of the linear scale is measured with the micrometer, so that errors due to the estimating of the position are corrected. This process is repeated at several places in order to eliminate any errors of division of the linear scale. It is of course assumed that the constant $\frac{\Delta}{D} = 100$ has been determined very exactly and the division of the linear scale also executed very exactly. The linear scale must be mounted very rigidly and protected against sinking and must stand exactly vertical. The converse of this process can be utilized for determining the constant $\frac{\Delta}{D}$.

For determining the height above the sea of the point at which the linear scale is arranged is used the formula $$h_L = (h_s + I) - (L - f_1) \pm h,$$

in which $h_s$ is the height above the sea of the position of the instrument; I, the height of the instrument; L, the total length of the linear scale, and $h$ the difference in height, which must be taken as positive for angles above the horizontal and negative for angles below the horizontal. $f_1$ is the first linear-scale reading of the fixed wire.

As for a given position of the instrument $h_s$, I, and L are constant, the level of the sea of the place of the linear scale can be expressed by $$h_L = K + f_1 \pm h, \text{ in which } K = h_s + I - L.$$

What I claim is—

1. A distance instrument comprising a telescope, a fixed wire therein, an arm rigidly connected to the telescope-axis and standing vertical when the telescope is horizontal, a horizontal bar, a slide adjustable thereon, and a knife-edge adjustable on the said slide and movable on it to a constant extent, the said arm resting against the said knife-edge.

2. A distance instrument comprising a telescope, a fixed wire therein, an arm rigidly connected to the telescope-axis and standing vertical when the telescope is horizontal, a horizontal bar, a slide adjustable thereon and a knife-edge adjustable on said slide and movable on it to a constant extent, an ocular "filar" screw-micrometer having a movable wire and a vertical limb having an index division.

In testimony whereof I have hereunto set my hand in presence of two subscribing witnesses.

WACLAW LASKA.

Witnesses:
ARTHUR SCHWEZ,
HENRY BOEQUEL.